United States Patent [19]

Cohen et al.

[11] 4,255,470

[45] Mar. 10, 1981

[54] PROCESS FOR PREVENTING POLYMER BUILDUP IN A POLYMERIZATION REACTOR

[75] Inventors: Louis Cohen; James B. Haehn, both of Avon Lake; Donald E. Witenhafer, North Olmsted, all of Ohio

[73] Assignee: The B. F. Goodrich Company, Akron, Ohio

[21] Appl. No.: 815,977

[22] Filed: Jul. 15, 1977

[51] Int. Cl.³ ............................................... C08F 10/00
[52] U.S. Cl. ...................................... 427/230; 526/62; 422/131
[58] Field of Search .......................... 526/62; 427/230; 23/252 A

[56] References Cited

U.S. PATENT DOCUMENTS 4,024,330  5/1977  Morningstar ........................ 526/62

OTHER PUBLICATIONS

"Organic Chemistry", Fieser and Fieser, 1944, p. 228.

*Primary Examiner*—Sam Silverberg
*Attorney, Agent, or Firm*—Roy P. Wymbs

[57] ABSTRACT

This invention relates to a process of coating the internal surface of a polymerization reactor in order to substantially eliminate the buildup of polymer on said surfaces during the polymerization process. There is applied to the surfaces a coating composition containing a straight chain or branched polyaromatic amine dissolved in an aqueous acid solution and thereafter the coated surfaces are flushed or rinsed with water without drying the same.

10 Claims, No Drawings

PROCESS FOR PREVENTING POLYMER BUILDUP IN A POLYMERIZATION REACTOR

BACKGROUND OF THE INVENTION

Various type chemical processes are commonly carried out in large, stirred vessels which are frequently provided with auxiliary equipment, such as baffles, heat transfer coils which enable heat to be supplied or extracted from the contents of the vessels. In many cases, however, such processes eventually produce undesirable deposits on the surfaces of the equipment with which the reaction mixture comes into contact. Such deposits interfere with the efficient transfer of heat to and from the interior of the vessel. Further, these deposits have a tendency to deteriorate and to partially fragment resulting in contamination of the reaction mixture and the products produced therefrom. This problem is particularly prevalent in polymerization type reactions, since the deposits, or buildup, of solid polymer on reactor surfaces not only interferes with heat transfer, but decreases productivity and adversely affects polymer quality.

This problem is particularly bad in the commercial production of polymers and copolymers of vinyl and vinylidene halides, when polymerized alone or with other vinylidene monomers having a terminal $CH_2=C<$ group, or with polymerizable polyolefinic monomers. For example, in the commercial production of vinyl chloride polymers, the same are usually produced in the form of discrete particles by polymerization in aqueous suspension systems. When employing such a polymerization system, the vinyl chloride, and other comonomers when used, are maintained in the form of small discrete droplets by the use of suspending agents and agitation. When the reaction is complete, the resultant polymer is washed and dried. These aqueous suspension system polymerization reactions are usually conducted under pressure in metal reactors equipped with baffles and high speed agitators. However, these suspension systems are very often unstable and during the polymerization reaction, vinyl chloride polymer builds up on the interior surfaces of the polymerization reactor, including the surfaces of the baffles and agitator. Obviously, this polymer buildup must be removed since it results in further formation of polymer buildup which in turn results in a crust that adversely affects heat transfer and contaminates the polymer being produced.

The nature of the polymer buildup, or insoluble deposit on the walls of the reactor, is such that in the commercial production of polymers, as described above, it has in the past been standard practice, after each polymerization reaction is completed, to have an operator enter the reactor and scrape the polymer buildup off the walls and off the baffles and agitator. An operation such as this is not only costly, both in labor and down-time of the reactor, but presents potential health hazards as well. While various methods have heretofore been proposed to reduce the amount and nature of polymer build-up on polymerization reactor surfaces, such as solvent cleaning, various hydraulic and mechanical reactor cleaners, and the like, none has proved to be the ultimate in polymer build-up removal. That is to say, these various methods and apparatus have done an acceptable job, but there is still room for improvement in this area, particularly from an economic point of view.

In U.S. Pat. No. 4,024,330, issued May 17, 1977, there is disclosed and claimed the use of polyaromatic amines dissolved in organic solvents as coating compositions for use in coating the internal surfaces of polymerization reactors. Also, in U.S. Pat. No. 4,024,301, there is disclosed and claimed the process of coating a polymerization reactor with a polyaromatic amine dissolved in an aqueous alkali metal hydroxide solution. These coating compositions have proved to be more than satisfactory for the purpose intended. The object of this invention is to apply certain of said polyaromatic amines to the internal surfaces of a polymerization reactor or vessel by a different process.

SUMMARY OF THE INVENTION

We have found that when the interior surfaces of a reactor are coated with a coating composition comprising a straight chain polyaromatic amine dissolved in an aqueous acid solution, such as aqueous HCl, for example, polymer buildup on said surfaces of the reactor is essentially eliminated. Due to the nature of the coating composition, it can be applied to the inner surfaces of the reactor without opening the same thus providing a closed polymerization system. In polymerizing the olefinic monomers, the same is done in an aqueous polymerization medium which is kept in constant contact with said coated surfaces throughout the polymerization reaction.

DETAILED DESCRIPTION

In accordance with the present invention, a film or coating of a polyaromatic amine is applied to the interior surfaces of a polymerization reactor or vessel by merely contacting said surfaces with an aqueous acid solution of said polyaromatic amine. Likewise, all exposed surfaces in the interior of the reactor, other than the walls, such as the baffles, agitator, and the like, are also treated in like manner. After the aqueous acid solution has been applied to said surfaces, the polymerization medium can be introduced to the reactor and the reaction started without the necessity of drying the surfaces prior to said introduction of the polymerization medium. However, it is preferred, and the best results are obtained, when after the application of the polyaromatic amine to the interior surfaces of the reactor, the surfaces are sprayed with water or the reactor is filled with water and drained, thereby, surprisingly, leaving on said surfaces a tightly adhering coating or film which is not affected by the polymerization medium.

The exact mechanism by which the polyaromatic amine coating or film functions to prevent buildup of polymeric scale on the interior surfaces of the reaction vessel is not certain but it is believed to be a free radical destroying mechanism or free radical trapping mechanism. This is believed to be so because aromatic diamines are known to destroy free radicals, for example, as in their well-known activity as antioxidants. Thus, with the destruction of the free radicals by the polyaromatic amine coating or film, polymerization on the interior surfaces of the reactor is inhibited.

The polyaromatic amines useful in the practice of the present invention are made by the self-condensation reaction of a polyamino benzene. Generally, such reactions are carried out with heat in the presence of an acidic catalyst. The polyaromatic amines thus formed have the following general structure:

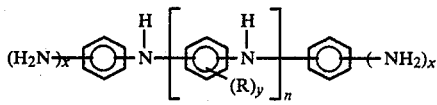

wherein R is H or NH$_2$, n is an integer from 0 to 5 and x and y are 1 or 2. As examples of the polyamino benzenes there may be named the ortho-, meta-, and para-phenylene diamines and triamino benzenes. Branched polyaromatic amines are possible when triamino benzenes are employed. In addition to the self-condensation reaction, any two or more of the above amines can be reacted together or cocondensed.

The molecular weight or degree of condensation of the polyaromatic amine depends upon the time and temperature of heating, and the kind and concentration of the catalyst. When reacting two amines together, they are employed in approximately equal molar proportions. Polyaromatic amines having a molecular weight in the range of about 250 to about 1000 are satisfactory for use in the present invention. Suffice it to say that the particular polyaromatic amine should have a molecular weight such that it is workable and soluble in an aqueous acid solution so that it can be easily applied to the inner surfaces of the reactor. We have found that polyaromatic amines having a molecular weight in the range of about 300 to about 600 are preferred.

The softening point of the polyaromatic amine is determined as follows: the polyaromatic amine is melted and cast into a split aluminum mold to make a cube which is ½ inch on a side. The mold is cooled, the cube removed therefrom and allowed to cool thoroughly. The cube is then attached to a thermometer bulb by heating the bulb to a temperature in excess of the expected softening point and laying it on the side of the cube, then cooling to 35° C. The thermometer with the cube attached is inserted into a mercury bath which has been preheated to 35° C. The insertion is made so that the top face or side of the cube is one inch below the mercury surface. The mercury bath is then heated at a rate of 4° C. per minute. The softening point is determined as the temperature at which, as the cube moves upward, the cube just breaks the surface of the mercury. It is to be noted that the cube should crawl up on the thermometer and not "pop up". This is accomplished by carefully controlling the rate of rise in temperature of the mercury bath.

When the above-identified compounds are self-condensed, or cocondensed, an acid catalyst is employed. We have found HCl to be the most effective catalyst. However, other useful catalysts may likewise be employed, such as, for example, methane sulfonic acid, benzene sulfonic acid, sulfanilic acid, phosphoric acid, iodine, benzene disulfonic acid, hydrogen bromide (HBr), hydrogen iodide (HI), aluminum chloride, and the like. The concentration of catalyst will vary depending upon the particular one used. It has been found, however, that a catalyst concentration of from about 0.005 mole to about 0.20 mole per mole of the compound or compounds being self-condensed, or cocondensed, is satisfactory. At any rate, the amount of catalyst employed is not critical.

The temperature of the reaction will vary depending upon the time of the reaction and the molecular weight desired in the final product. For example, one can heat the reaction ingredients to 315° C. rapidly and then hold at that temperature for various periods of time. Also, the reaction ingredients can be heated to various temperatures above 300° C. and immediately cooled. When this latter procedure is employed, we define the time of reaction as 0 hours. Accordingly, the temperature of the reaction will vary from about 150° C. to about 360° C. and the time of reaction will vary from about 0 hour to about 3 hours. The preferred range of reaction temperature is from 175° C. to 330° C. and the time of reaction from 0 hour to 1 hour. It is understood, of course, that the particular time and temperature selected is dependent upon the catalyst employed and the final molecular weight desired.

The polyaromatic amine coating solution is made by conventional methods, using heat and agitation where necessary. The polyaromatic amine is dissolved in the appropriate aqueous acid solution to an extent such that the solids content of the coating solution does not prevent it being sprayed on the inner surfaces of the reactor through spray nozzles mounted permanently thereon. Usually a coating solution having a solids content of polyaromatic amine in the range of about 0.1% to about 20.0% by weight is satisfactory. However, the solids content depends upon the molecular weight of the polyaromatic amine. That is, the solids content could, in certain instances, be greater than 20.0% or less than 0.1% by weight. In addition, additives may be employed in the coating solution, if desired, such as plasticizers, stabilizers, lubricants, or fillers, and the like. Of course, when additives are employed, suitable adjustment in the solids content of the coating solution is made.

The aqueous acid solutions used in making the coating solutions of the instant invention are those made from inorganic and organic acids. Representative of the inorganic acids are hydrochloric, sulfuric, phosphoric, and the like. Among the organic acids there may be named acetic acid, formic acid, chloroacetic acid and toluene sulfonic acid, etc. The most important point is that the acid chosen must give the proper pH in aqueous solution. Usually, a pH in the range of about 1 to about 5 is satisfactory. A preferred pH range is from 1.5 to 3.

The temperature of the aqueous acid solution when the polyaromatic amine is dissolved therein is not critical. Usually a temperature in the range of about 5° C. to about 100° C. is satisfactory. Agitation during dissolution of the polyaromatic amine is desirable and in some instances necessary. In order to obtain the desired results, the concentration of the acid in the aqueous solution may be varied between about 0.01% by weight to about 20.0% by weight. The preferred concentration of acid is from 0.05% to 2.0% by weight.

As previously pointed out, the coating solution is usually applied to the inner reactor surfaces by spraying. However, it is also possible to apply the coating solution by flooding the reactor and then draining, or by brushing or painting on, but spraying is the most practical and economical method of application. After spraying the coating solution on the inner surfaces and draining the reactor, the polymerization reaction can be started immediately without further treatment of said surfaces. However, it has been found that best results are obtained when after applying the coating solution to the surfaces of the reactor, the surfaces are sprayed with water and the reactor drained prior to charging the reactor with the polymerization mix. The present coating works equally well on glass or metal surfaces, such as stainless steel, and the like.

While the exact adhesion mechanism of the coating to the surface is not known for certain, it is believed to involve some type of electrical force or adsorption between the reactor surfaces and the polyaromatic amine. At any rate, the coating composition of the present invention does substantially eliminate polymer buildup on the reactor surfaces and what little polymer buildup, if any, that may occur, is of the sandy type which is of such a nature that it is readily removable from the reactor surfaces. The polymer buildup to be avoided is what is referred to as "paper buildup" since this type of buildup is very difficult to remove and usually requires hand scraping or a high pressure jet stream of water or other liquid. In either event, the reactor must be opened in order to clean the same which, of course, allows the escape into the atmosphere of unreacted monomer, such as vinyl chloride.

In accordance with this invention, several polymerizations may be run in a coated reactor before having to recoat the surfaces thereof. However, we have found it expeditious, and it is preferred, to coat the internal surfaces of the reactor after each polymerization run therein. As previously pointed out, with the spray nozzles permanently mounted at strategic points on the reactor, it is possible to reach all inner surfaces thereof. After each polymerization is complete and the reactor is drained, the inner surfaces are sprayed with water and the reactor flushed. Then the coating solution is sprayed on the surfaces and the reactor is drained of the excess solution in such a way that the solution can be sent to a recovery system, if desired. Then the surfaces are sprayed with water and the effluent is discarded, or recovered, if desired. Thereafter, the reactor is charged with the polymerization medium and ingredients in the usual manner and the polymerization reaction commenced. This cycle of operation is repeated after each polymerization run without opening the reactor. This has the distinct advantage of substantially eliminating the escape of unreacted monomer vapors to the surrounding atmosphere, which under present day Governmental regulations must be kept to a minimum.

After each application of the coating composition on the interior surfaces of the reaction vessel and spraying thereof with water the reaction to be carried out in the equipment may be commenced immediately, no particular modification of processing techniques being required due to the presence of the coating. Further, utilization of the internally coated reaction vessel of the present invention does not adversely affect the heat stability or other physical and chemical properties of the polymers produced therein.

While the present invention is specifically illustrated hereinafter with regard to the suspension polymerization of vinyl chloride, it is to be understood that the apparatus and process may likewise be applied in the dispersion, emulsion, or suspension polymerization of any polymerizable ethylenically unsaturated monomer or monomers where undesirable polymer buildup occurs. Examples of such monomers are other vinyl halides and vinylidene halides, such as vinyl bromide, vinylidene chloride, etc.; vinylidene monomers having at least one terminal $CH_2=C<$ grouping, such as esters of acrylic acid, for example, methyl acrylate, ethyl acrylate, butyl acrylate, octyl acrylate, cyanoethyl acrylate, and the like; vinyl acetate; esters of methacrylic acid such as methyl methacrylate, butyl methacrylate, and the like; styrene and styrene derivatives including α-methyl styrene, vinyl toluene, chlorostyrene; vinyl naphthalene; diolefins including butadiene, isoprene, chloroprene, and the like; and mixtures of any of these types of monomers and other vinylidene monomers copolymerizable therewith; and other vinylidene monomers of the types known to those skilled in the art.

The present invention, however, is particularly applicable to the suspension polymerization of vinyl chloride, either alone or in admixture with one or more other vinylidene monomers having at least one terminal $CH_2=C<$ grouping, copolymerizable therewith in amounts as great as about 80% or more by weight, based on the weight of the monomer mixture, since polymer buildup in the reaction vessel is a particularly bad problem here.

In the present invention, the polymerization process is usually conducted at a temperature in the range of about 0° C. to about 100° C. depending upon the particular monomer or monomers being polymerized. However, it is preferred to employ temperatures in the range of about 40° C. to about 70° C., since, at these temperatures polymers having the most beneficial properties are produced. The time of the polymerization reaction will normally vary from about 2 to about 15 hours.

The polymerization process may be carried out at autogenous pressures although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixture.

Further, the polymerization process may be carried out utilizing a full reactor technique. That is, the reaction vessel is completely filled with the polymerization medium and kept that way throughout the reaction by constant addition thereto of water or additional make-up liquid containing the monomer or monomers in the same proportion as at start-up. Upon the addition of a certain predetermined amount of liquid, the polymerization reaction is terminated, usually by the addition thereto of a short-stopping agent. The necessity for the addition of liquid is due to the shrinkage in volume of the reaction medium produced by the conversion of the monomer or monomers to the polymeric state.

In order to rate the various coatings, as particularly set forth in the specific examples which follow hereinafter, we have devised a rating scale with respect to paper and sandy buildup, as described above. An uncoated reactor, where normal amounts of both types of buildup occurs, is given a rating of 1.5. Any rating below 1.0 is good or a definite improvement. In other words, 0.0 rating is perfect, and so on.

In order to more clearly define the present invention, the following specific example is given. It is to be understood, however, that this is merely intended in an illustrative and not in a limitative sense. In the example, all parts and percents are by weight unless otherwise indicated.

EXAMPLE I

The self-condensation product of m-phenylenediamine (m-PDA) was made for use in this Example. The polyaromatic amine was made by charging 109 grams of m-PDA to a flask equipped with a reflux condenser and heating to a temperature of 200° C. After reaching this temperature, 0.5 grams of $AlCl_3$ catalyst was added and the temperature was raised to 250° C. Heating at 250° C. was continued for 11 hours and the $NH_3$ coming off was collected in a water trap. Thereafter the reaction mixture was vacuum distilled in order to remove any unreacted diamine. The resulting polyaromatic amine or condensed m-PDA had a softening point of 64° C.

The polyaromatic amine was dissolved in 0.1 N HCl to give a 1.5% by weight solution of self-condensed m-PDA. The pH of the resultant coating solution was 2.7. The internal surfaces of a polymerization reactor were coated with this solution and then rinsed with water. The following recipe was then charged to the reactor in usual fashion:

| Vinyl chloride | 1000 grams |
|---|---|
| Water (demineralized) | 2055 grams |
| Vinol 540* | 0.5 gram |
| SBP** (catalyst) | 0.5 cc. |

*89% hydrolyzed polyvinyl acetate **di-secondary butyl peroxydicarbonate

The polymerization reaction was carried out in a full reactor, that is, sufficient water was added to fill the reactor, and at a temperature of 57° C. with agitation. The reaction was continued with addition of water as the reaction mixture shrank because of formation of polymer in order to keep the reactor full. The reaction was discontinued upon the addition of 400 grams of water. After removal of the contents of the reactor the internal surfaces were classified or rated with the following results: paper buildup 0.0 and sandy buildup 0.01. This clearly shows the superiority of the use of a coated reactor over an uncoated reactor.

In the case of any of the herein disclosed polyaromatic amines, the cycle is repeated with each batch without opening the polymerizer. This is accomplished by using spray nozzles mounted in the dome of the reaction vessel or polymerizer, spraying the coating solution on the interior surfaces, draining, and recovering, if desired, spraying with water through the same nozzles, draining and then charging the polymerization mixture. After polymerization, the contents are removed and the interior rinsed with water by means of the spray nozzles. Thereafter the cycle is repeated without opening the reactor. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the scope of the appended claims.

We claim:

1. A process for substantially eliminating the buildup of polymers on the internal surfaces of a polymerization reaction vessel which comprises applying to said surfaces a coating solution comprised of a polyaromatic amine having a molecular weight in the range of about 250 to about 1000 dissolved in an aqueous acid solution, said polyaromatic amine having the structure

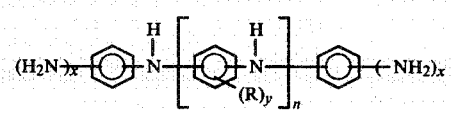

wherein R is H or $NH_2$, x and y are 1 or 2, and n is from 0 to 5.

2. A process as defined in claim 1 wherein the coating solution has a pH in the range of about 1.0 to about 5.0.

3. A process as defined in claim 1 wherein the acid solution is aqueous hydrochloric acid.

4. A process as defined in claim 2 wherein the polyaromatic amine has a molecular weight in the range of 300 to 600.

5. A process as defined in claim 1 wherein the polyaromatic amine is self-condensed m-phenylene diamine.

6. A process as defined in claim 1 wherein the concentration of acid in the aqueous solution is in the range of about 0.01% to about 20.0% by weight.

7. A process as defined in claim 1 wherein the concentration of polyaromatic amine in the coating solution is in the range of about 0.1% to about 20.0% by weight.

8. A process as defined in claim 1 wherein the acid solution is aqueous phosphoric acid.

9. A process as defined in claim 1 wherein said surfaces after being coated are rinsed with water.

10. A process as defined in claim 5 wherein the self-condensed m-phenylene diamine is dissolved in aqueous hydrochloric acid at a concentration of 1.5% by weight and a pH of 2.7.

* * * * *